United States Patent [19]
Unterberger

[11] 3,755,906
[45] Sept. 4, 1973

[54] APPARATUS FOR MEASURING THE RADII OF CURVATURE OF CAM DISCS

[76] Inventor: Richard Unterberger, 20 Gellertstrasse, Munich, Germany

[22] Filed: June 17, 1970

[21] Appl. No.: 46,933

[30] Foreign Application Priority Data
June 18, 1969 Germany.................. P 19 30 769.8

[52] U.S. Cl............................................... 33/172 R
[51] Int. Cl. .............................................. G01b 5/20
[58] Field of Search.................................. 33/172 A

[56] References Cited
UNITED STATES PATENTS

| | | | |
|---|---|---|---|
| 3,479,744 | 11/1969 | Howland............................ | 33/172 R |
| 1,672,566 | 6/1928 | Glancy................................ | 33/172 R |
| 1,563,468 | 12/1925 | Carreau ............................. | 33/172 R |
| 1,593,671 | 7/1926 | Plummer............................ | 33/172 R |
| 2,840,919 | 7/1958 | Ranard............................... | 33/174 R |
| 2,716,287 | 8/1955 | Hilstrom ............................ | 33/174 R |
| 2,638,680 | 5/1953 | Baker.................................. | 33/174 C |

Primary Examiner—Louis R. Prince
Assistant Examiner—Dennis A. Dearing
Attorney—Markva and Smith

[57] ABSTRACT

An apparatus for measuring the radii of curvature of cam discs comprises a sensitive tracer of which the housing bears a headpiece with two fixed measuring points, the tracer point to be applied to a cam being situated between these latter. A mounting support for the sensitive tracer, in order to enable the position of the latter to be fixed, is pivotable about a swivel shaft which is preferably situated on one and the same line with one of the measuring points but perpendicular to the measuring plane and is displaceable parallel to itself. A shaft which is likewise perpendicular to the measuring plane and thus parallel to the swivel shaft of the mounting support serves for rotating the cam disc of which the radius of curvature is to be measured. For guiding the apparatus in the measuring plane, the swivel shaft of the mounting support is articulated to one end of a connecting rod of which the other end is provided with a bore parallel to that which accommodates the swivel shaft, the connecting rod being pivotally connected, via said bore and by means of a pin, to a bearing member displaceable, in the measuring plane or parallel thereto, along a straight and preferably horizontal guide.

6 Claims, 5 Drawing Figures

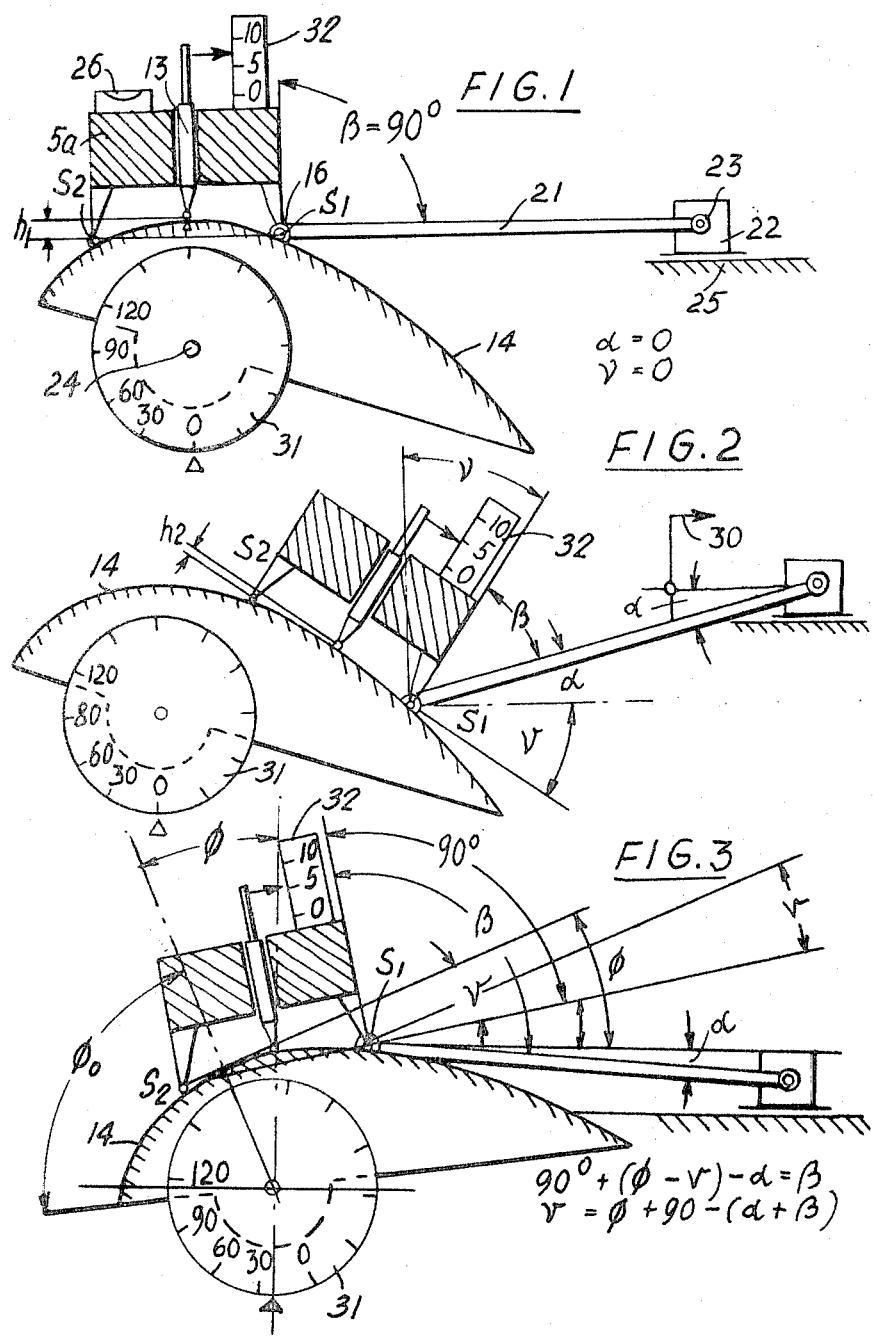

INVENTOR
RICHARD UNTERBERGER
BY
Lowry, Rinehart, Markva & Smith
ATTORNEYS

APPARATUS FOR MEASURING THE RADII OF CURVATURE OF CAM DISCS

BACKGROUND OF THE INVENTION

This invention relates to an apparatus serving to measure the radii of curvature of cam discs, and consisting of a sensitive tracer of which the housing bears a headpiece with two fixed measuring points, the tracer point to be applied to a cam being situated between these latter, while the mounting support of the sensitive tracer, in order to enable the position of the latter to be fixed, is pivotable about a swivel shaft which is preferably situated on one and the same line with one of the measuring points but perpendicular to the measuring plane and which is displaceable parallel to itself, a shaft being provided which is likewise perpendicular to the measuring plane and thus parallel to the swivel shaft of the mounting support, for the purpose of rotating the cam disc of which the radius of curvature is to be measured.

With such an apparatus the operation can be carried out far more rapidly and at the same time more accurately than with apparatus hitherto customary. Where the requirements are still more exacting, however, particularly as regards the saving of time when the equipment is used in industry, this apparatus still proves inadequate.

SUMMARY OF THE INVENTION

It is the object of the invention to shorten the time required still further, by the automation of the measuring process.

To attain this object, the present invention provides an apparatus of the kind described, which is characterized by the fact that for guiding the apparatus in the measuring plane, the swivel shaft of the mounting support is articulated to one end of a connecting rod of which the other end is provided with a bore parallel to that which accomodates the swivel shaft, the connecting rod being pivotally connected, via said bore and by means of a pin, to a bearing member displaceable, in the measuring plane or parallel thereto, along a straight and preferably horizontal guide.

The connecting rod may be of infinite length, so that it is replaced by a sliding guide, perpendicular to its longitudinal axis in the initial position.

The bearing member with its guide for the free end of the connecting rod may be replaced by a sliding guide for a mounting support, this latter containing the sliding guide which is perpendicular to the longitudinal axis of the connecting rod in the initial position.

For measuring the angles between the longitudinal axis of the connecting rod and the guide and also between the connecting rod and the axis of the tracer point, as well as for measuring the angle of rotation of the cam disc itself and the longitudinal displacement of the mounting support, the apparatus may include graduated scales, potentiometer, synchros or digital measuring instruments.

The height of the arc may be measured by means of an electrical measuring instrument.

A computing apparatus may be provided for adding the angular values measured on the analog principle, i.e. by means of potentiometers or synchros or by the digital method.

According to yet a further feature of the invention, the cam disc may be rotated by means of mechanical or electrical driving devices known per se.

The same means may be used for the displacement of the bearing member an of the mounting support.

An apparatus constructed on these lines measures the value $h$ as a function of the angle of inclination $v$ of the connecting line between the two measuring points in respect of an assumed initial or reference position, which is preferably horizontal. This angle of inclination can be obtained by the formula $$v = \phi + 90 - (\alpha + \beta)$$

This apparatus thus provides an automatic means of recording the curve for $h = f(v)$ and $\rho = F(v)$.

In the case of the connecting rod of infinite length, the operation of measuring the angle $\alpha$ is eliminated, and the functions of $h$ and $\rho$ are as given above.

Needless to say, if the direction taken by the guide perpendicular to the longitudinal axis of the connecting rod in the initial position passes through the origin of the coordinates for the polar coordinate diagram, then the equipment to which the invention relates also enables the angle $\beta - 90°$ between the normal of the cam and the polar coordinate R to be represented as a function of $\rho$.

It is likewise possible to show $h$ as a function of $\phi$. If the cam disc is left stationary ($\phi = 0$), it is possible, by displacing the bearing member, to draw the sensitive tracer over the part of the cam to be measured. In this case, $h$ and $\beta - 90°$ are obtained as a function of the said displacement $\chi$.

A coordinate recorder can be used to record the values measured.

The same apparatus is suitable as a means of measuring the radii of curvature, e.g. of profiled parts of turbine and compressor blades.

BRIEF DESCRIPTION OF THE DRAWINGS

In the accompanying drawings the essential mechanical part of the apparatus to which the invention relates is shown schematically, with the relevant angles, as applied to a section of a cam disc.

FIG. 1 shows a measuring apparatus according to the invention in the initial position;

FIG. 2 shows the measuring apparatus after it has been adjusted, by moving the bearing member, to an arbitrary point to be measured on the cam;

FIG. 3 shows the position to which the measuring device has moved from the starting position as a result of the rotation of the cam about its axis;

DESCRIPTION OF THE PREFERRED EMBODIMENTS

Figure 4:
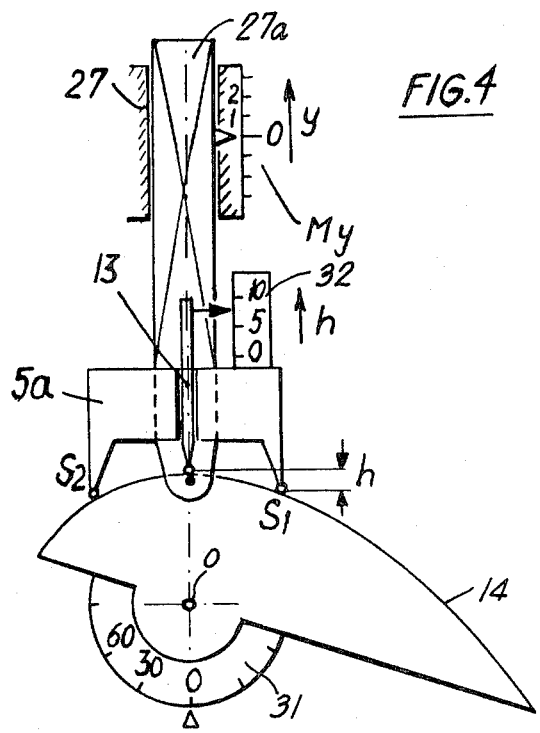
FIG. 4 shows the measuring device in the case of a connecting rod which is assumed to be of infinite length and which has thus been replaced by a guide taking a perpendicular direction in relation to its longitudinal axis.

FIG. 1 shows a mounting support $5a$ for a sensitive tracer having measuring points S and $S_2$ and a tracer point 13 which rests on the cam 14 to be measured. A swivel shaft 16, to which one end of a connecting rod 21 is articulated, is in alignment with the measuring point $S_1$. The connecting rod 21 is connected at its other end with a bearing member 22, via a pin 23. That is, member 22 is bearing the end of the connecting rod 21 via pin 23. The reference numeral 24 denotes a shaft which extends in the same way as the swivel shaft 16 perpendicular to the measuring plane and serves for rotating the cam disc of which the radius of curvature is to be measured. The shaft 24 is held in position by bearings mounted on a common base plate. The bearings are positioned before and behind the plane of the drawing in this embodiment. These parts as well as the supports and the base plate are not shown in the drawing as they are not essential to the understanding of the invention. The bearing pedestal 22 is mounted so that it can be moved in the direction shown by the arrow 30 (FIG. 2) along a preferably horizontal guide 25. This guide is mounted with a support (not shown) on the common base plate (not shown) mentioned above.

To enable it to be set to the horizontal reference position or initial position Δ, the mounting support 5a bears a level 26 (only shown in FIG. 1) or else the position of the bearing member 22 on the guide 25 is read off from a scale (not shown). The initial position of the cam itself is read from a dial 31. In all positions of the support 5a and the cam 14, respectively, the arc height is indicated on a scale 32.

In FIG. 4 the connecting rod 21 assumed to be of infinite length is replaced by a guide 27 which takes a direction perpendicular to the longitudinal axis of the connecting rod as shown in FIG. 1. A scale My provides a reading of the distance over which the mounting support 27a slides in said guide, while for the indication of the height of the arc, h, use is once again made of a scale 32 on the mounting support 5a.

Figure 5:
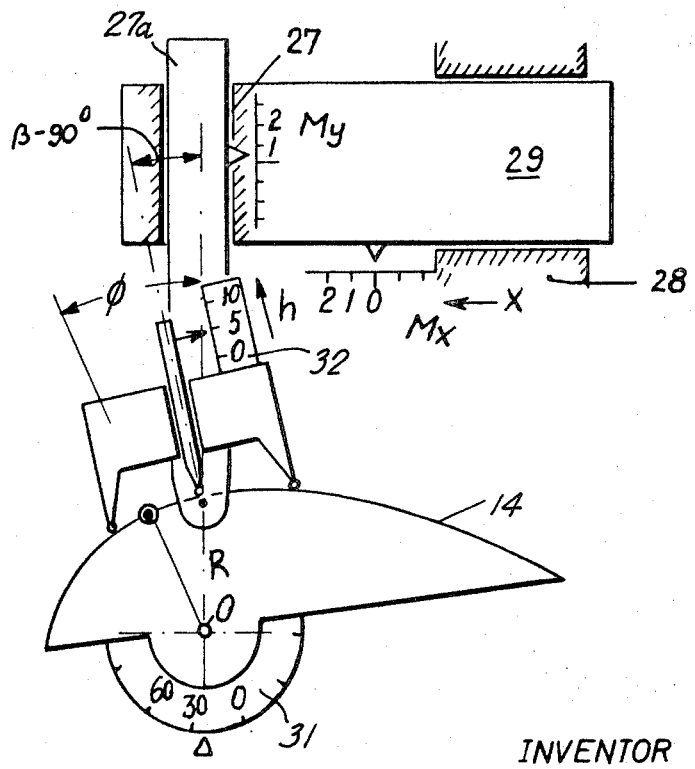
FIG. 5 shows the same apparatus with the guide situated in a mounting support which, in its return, is displaceable in a guide perpendicularly to the guide first mentioned.

FIG. 5 shows a further development of the construction described above, the member 27a located in guide 27 being again perpendicular to the longitudinal axis of the connecting rod 21 in the initial position as shown in FIGS. 1-3 and situated in a mounting support 29 which, in its turn, is displaceable in a guide 28 mounted via support (not shown) on the base plate (not shown) mentioned above. The distance over which it is displaced is read off from a scale $M_x$.

Both embodiments shown are based on the special circumstances in which the direction taken by the guide 27 passes through the origin O of the coordinates for the polar coordinate diagram.

The invention may be embodied in other specific forms without departing from the spirit or essential characteristics thereof. The embodiments are therefore to be considered in all respects as illustrative and not restrictive.

What is claimed is:
1. An apparatus for measuring the radii of curvature of a cam disc comprising:
   a. a sensitive tracer mechanism including a housing carrying a head piece having two fixed measuring points and a tracer measuring point disposed for vertical movement with respect to and between said fixed points,
   b. said measuring points being aligned and located within a measuring plane,
   c. a mounting support means for the sensitive tracer mechanism,
   d. said mounting support means including a swivel shaft,
   e. said swivel shaft being displaceable parallel with respect to itself,
   f. said cam disc being rotatably mounted on a cam supporting shaft for rotation about an axis perpendicular to the measuring plane in which the radii of curvature is to be measured,
   g. said cam disc supporting shaft being disposed perpendicularly to the measuring plane and parallel to said swivel shaft, and
   h. means for guiding the sensitive tracer mechanism along the cam surface for which the radii of curvature is being measured,
   i. said guiding means including a connecting rod and a bearing member displaceably disposed along a straight guide surface,
   j. said connecting rod being pivotally connected at one end to said swivel shaft and pivotally connected at the other end thereof to said bearing member,
   k. said connecting rod being movable in a plane parallel to the measuring plane.
2. An apparatus as defined in claim 1 wherein the bearing member consists of a slide guide disposed in a mounting support.
3. An apparatus as defined in claim 1 wherein means is provided for measuring the angle between the longitudinal axis of the guiding rod and the straight guide surface, the angle between the longitudinal axis of the connecting rod and the axis of the tracer measuring point, the angle of rotation of the cam disc about its supporting shaft, and the longitudinal displacement of the mounting support means for the sensitive tracer mechanism.
4. An apparatus as defined in claim 2 wherein a measuring means is provided for reading the displacement of the mounting support in the guide member,
said measuring means being a graduated scale.
5. An apparatus as defined in claim 1 wherein said swivel shaft is located on one and the same line with one of the fixed measuring points and is arranged perpendicular to the measuring plane.
6. An apparatus for measuring the radii of curvature of a cam disc comprising:
   a. a sensitive tracer mechanism including a housing carrying a head piece having two fixed measuring points and a tracer measuring point disposed for vertical movement with respect to and between said fixed points,
   b. said measuring points being aligned and located within a measuring plane,
   c. a mounting support means for the sensitive tracer mechanism,
   d. said mounting support means including a swivel shaft,
   e. said swivel shaft being displaceable parallel with respect to itself,
   f. said cam disc being rotatably mounted on a cam supporting shaft for rotation about an axis perpendicular to the measuring plane in which the radii of curvature is to be measured,
   g. said cam disc supporting shaft being disposed perpendicularly to the measuring plane and parallel to said swivel shaft, and
   h. means for guiding the sensitive tracer mechanism along the cam surface for which the radii of curvature is being measured,
   i. said guiding means including a guide member and a guide mounting support,
   j. said guide member extending vertically from said mounting support means and situated in said guide mounting support which is horizontally displaceable.

* * * * *